United States Patent Office 2,856,311
Patented Oct. 14, 1958

2,856,311

PROCESS FOR OPTICALLY BRIGHTENING FIBROUS MATERIALS

Adolf Emil Siegrist, Basel, and Willy Mueller, Riehen, Switzerland, assignors to Ciba Limited, Basel, Switzerland, a Swiss firm No Drawing. Application February 17, 1956
Serial No. 566,091

Claims priority, application Switzerland May 21, 1952

14 Claims. (Cl. 117—33.5)

This is a continuation in part of copending application Serial No. 355,841, filed May 18, 1953 (which has issued, since the filing of the present application, as U. S. Patent No. 2,765,239, dated October 2, 1956).

The present invention is based on the observation that fibrous materials, especially textile materials, can be optically brightened in an advantageous manner by fixing on the material a compound of the formula (1)
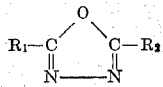

in which $R_1$ and $R_2$ represent aromatic radicals each of which contains three conjugated carbon-to-carbon double bonds in conjugated relation with the double bonds of the ox-diazole ring, and which compounds contain a single amino group and this amino group is in para-position relatively to the ox-diazole ring.

The requirement that the aromatic radical $R_1$ and $R_2$ each contain three conjugated carbon-to-carbon double bonds in conjugated relation with the double bonds of the ox-diazole ring means that two benzene nuclei must be bound directly to the ox-diazole ring, one in the 2-position and the other in the 5-position, and that neither of these benzene nuclei must contain substituents which would lengthen the chain of conjugated carbon to carbon double bonds.

The amino group present in the compounds used in the present invention may be a primary or advantageously a substituted amino group. Good results are obtained, for example, with compounds which contain dialkylamino groups having alkyl radicals of low molecular weight, such as dimethylamino or diethylamino groups. Especially valuable are those compounds of the above constitution which contain an amino group containing a substitutent imparting solubility in water, such an alkyl sulfonic acid group. Other substituents may be bound directly to the benzene nuclei, for example, methyl or ethyle groups or halogen atoms, especially chlorine atoms.

As examples of compounds suitable for use in the present process there may be mentioned those of the formula (2)
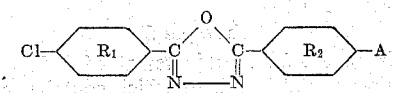

in which A represents an amino group, for example, a dialkylamino group or an amino group of the constitution —NH—R—SO$_3$H, in which R represents an alkyl radical. Instead of the chlorine atom, the benzene nucleus $R_1$ may contain a hydrogen atom or another substituent, for example, a methyl group or methoxy group.

The compounds used as optical brightening agents in the present process can be made by methods in themselves known. Compounds of the Formula 2 in which A represents a dialkylamino group, and analogous compounds which contain another negative substituent instead of the chlorine atom, can be obtained, for example, by reacting a hydrazide of the formula

with an aryl-carboxylic acid of the formula HOOC—$R_2$ with the aid of sulfur trioxide, in which formulae $R_1$ and $R_2$ represent benzene radicals of which one contains in para-position to the —CO— group a dialkylamino group and the other contains a negative substituent.

The compounds of the Formula 2 in which A represents a group of the constitution —NH—R—SO$_3$H, can be obtained from the appropriate compound containing a primary amino group by introducing the substituent —R—SO$_3$H by means of a substance suitable for this purpose, such as an aldehydebisulfite compound, for example, a formaldehyde alkali bisulfite or by means of butane sultone. The 2-[4'-chlorophenyl-(1')]-5-[4"-aminophenyl-(1")]-1:3:4-ox-diazole used as starting material for this purpose can be obtained by reacting para-chlorobenzoic acid monohydrazide and para-nitrobenzoic acid with oleum, and reducing the nitro group in the resulting 2-[4'-chlorophenyl-(1')] - 5 - [4"-nitrophenyl-(1")]-1:3:4-ox-diazole to an amino group.

The ox-diazole compounds used in the present process can be applied by methods in themselves known, for example by treating the fibrous material in a bath which contains the optical brightening agent, advantageously at a raised temperature, or by immersing the fibrous material in a solution, especially an aqueous solution, or dispersion of the optical brightening agent and, after centrifuging the material, drying it. Basic compounds, that is to say, those of the aforesaid constitution which contain no acid groups, are advantageously used in the form of aqueous solutions of their salts formed with acids, for example, sulfuric acid, formic acid or acetic acid. Compounds which contain acid groups may, if desired, be applied in the form of aqueous solutions of their alkali metal salts. Furthermore, there may be used in the present process solutions of the said compounds in organic solvents. It is also possible to treat the material to be brightened, especially synthetic fibers, with the compounds in dispersed form, for example, with dispersions which are produced with the aid of dispersing agents, such as soaps, soap-like substances, polyglycol ethers of fatty alcohols, sulfite cellulose waste liquor or condensation products of formaldehyde with a naphthalene sulfonic acid which, if desired, may be alkylated.

The compounds to be used in the present process may also be applied during the manufacture of the material to be treated, for example, by adding the compound to a viscose solution which is to be used for producing fibers, or to another spinning mass, for example, a mass of linear synthetic polyamide or a solution of acetylcellulose to be used for spinning.

The compounds serving as optical bleaching agents in the present process may also be applied in the following ways: (a) In admixture with dyestuffs or as additions to dyebaths, printing pastes or discharge or reserve pastes. Also for after-treating dyeings, prints or discharge prints. (b) In admixture with chemical bleaching agents or as additions to bleaching baths, for example, together with sodium hypochlorite. (c) In admixture with dressing agents, such as starches or synthetically prepared dressings. The compounds used in this invention may also be added, for example, to liquors to be used for producing an anti-creasing dressing.

The optical brightening agents, whether water-soluble or water-insoluble, may also be used together with detergents. The detergent and the brightening agent may be added separately to the washing bath. It is also of advantage to use a detergent which contains the brightening agent admixed therewith. As detergents there may be used, for example, soaps, salts of sulfonate detergents, for example, salts of sulfonated benzimidazoles substituted at the 2-carbon atom by a higher alkyl radical, salts of monocarboxylic acid esters of 4-sulfophthalic acid with higher fatty alcohols, or salts of fatty alcohol sulfonates, alkyl-aryl sulfonic acids or condensation products of higher fatty acids with aliphatic oxy- or amino-sulfonic acids. There may be used ion-free detergents, for example, polyglycol ethers which are derived from ethylene oxide and higher fatty alcohols, alkyl-phenols or fatty amines.

The detergents may also contain the usual additions, such as alkali metal carbonates, phosphates, pyrophosphates, polyphosphates, metaphosphates, silicates, perborates or percarbonates. Detergents may also be prepared which consist wholly or predominantly of inorganic cleansing compounds and the brightening agents. The mixtures of detergents and optical brightening agents can be prepared in a simple manner by mixing and/or grinding the components together. For this purpose it may be of advantage to use one or other of the components in a dissolved or molten condition in order to facilitate mixing.

It generally suffices to add a small proportion of the ox-diazole compound to the detergent. For example, the proportion may amount to 0.1 to 5 percent on the weight of the detergent. Even smaller quantities may be added, for example, 0.01 percent or even less. The brightening agents used in this invention may be used in admixture with known brightening agents.

The detergents of this invention may be used in the customary washing processes. In this manner the material to be cleansed is simultaneously washed and brightened.

As materials which may be treated by the present process there may be mentioned the following:

(a) Textile materials in general, which may be in any desired form, for example, in the form of fibers, threads, yarns, woven or knitted goods or in the form of felt, and all manufactured articles made therefrom; and such textile materials may consist of nitrogenous fibers, for example, natural materials of animal origin, such as silk or advantageously wool, or fibers of vegetable origin, such as cellulosic material of cotton, hemp, flax, linen, jute or ramie, and also semi-synthetic materials, such as regenerated cellulose, for example, artificial silk, viscose and staple fibers thereof, cellulose acetate artificial silk, or synthetic materials which are obtained by polymerization, or copolymerization, or those obtainable by polycondensation, such as polyacrylonitrile, polyesters and above all polyamides, such as nylon.

(b) Fibrous materials of other kinds which are not textiles, and may be of animal origin, such as feathers, hair, pelts or skins and leather produced from the latter by natural or chemical tanning, and also finished manufactured products made therefrom; and also fibrous materials of vegetable origin, such as straw, wood, wood pulp or fibrous materials consisting of compressed fibres, such as paper, pasteboard or compressed wood, and also manufactured goods made therefrom.

Although water-insoluble compounds may be used in the present process, it is especially advantageous to use compounds which contain groups imparting solubility in water, such as free or neutralized sulfonic acid groups and/or carboxylic acid groups, quaternary ammonium groups or polyglycol residues. When the compounds contain as a salt-forming group only the amino group which may be alkylated or aralkylated, for example, a monoethylamino, diethylamino, dimethylamino, oxyethylamino or dioxyethylamino group, they are advantageously used in the form of their water-soluble salts.

From the disclosures contained in U. S. patent application Ser. No. 355,841, it would be concluded that compounds of the formula

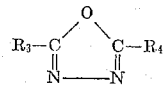

are useful optical bleaching agents only when each of the radicals $R_3$ and $R_4$, which are free from substituents enhancing the fluorescence, contains four double bonds in conjugated relation with the double bonds of the ox-diazole, or contains three such double bonds and an aromatically bound amino group. It could therefore not be expected that the ox-diazole compounds used in the present process, which contain only one radical having three conjugated double bonds and an amino group, and in which the other radical contains only three double bonds and no amino group, would produce a good optical brightening effect.

The following examples illustrate the invention, the parts and percentages being by weight:

Example 1

Wool is treated for 30 minutes at a liquor ratio of 1:40 in a bath heated at 45–50° C., which contains, per liter, 0.025 to 0.05 gram of 2-[4′-chlorophenyl-(1′)]-5-[4″-diethylamino or 4″-dimethyl-phenyl-(1″)]-1:3:4-ox-diazole dissolved in 12.5 grams of sulfuric acid of 10 percent strength. The material is then rinsed and dried. The treated wool has a higher content of white than the untreated wool.

The 2-[4′-chlorophenyl-(1′)]-5-[4″-diethylaminophenyl-(1″)]-1:3:4-ox-diazole may be prepared as follows:

192 parts of oleum (27% of $SO_3$) are cooled to 5° C., and 51.2 parts of para-chlorobenzoic acid monohydrazide and 57.9 parts of para-diethylamino-benzoic acid are added, while cooling and stirring well, so that the temperature does not rise above 30° C. The temperature is then raised to 65° C. in 30 minutes and then the mixture is stirred for 5–6 hours at 65–70° C. The reaction mixture is cooled, and poured while stirring, into 1000 parts of ice water, whereupon the condensation product precipitates in the form of a white suspension. The mixture is filtered with suction, the filter residue is washed with cold water and then stirred into 1000 parts of water at 30–40° C., and the mixture is rendered distinctly alkaline with an aqueous solution of sodium hydroxide. By filtering the mixture with suction, washing the filter residue with a large amount of water and drying it, there is obtained in good yield 2-[4′-chlorophenyl-(1′)]-5-[4″-diethylaminophenyl-(1″)]-1:3:4-ox-diazole of the formula

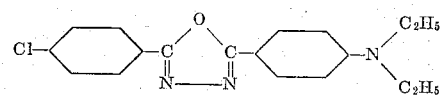

in the form of a white powder, which melts at 160–161° C. after recrystallization from ethanol. A dilute alcoholic solution of this product, when subjected to ultraviolet rays exhibits an intense greenish blue fluorescence.

By using, instead of the above-mentioned para-diethylamino-benzoic acid an equivalent quantity of para-dimethylaminobenzoic acid there is obtained a product having similar properties.

Example 2

Wool is treated for 30 minutes at 45–50° C. and at a liquor ratio of 1:40 in a bath which contains, calculated on the weight of the fibrous material, 5 percent of the acetic acid of 40 percent strength and 1 percent of the sodium salt of 2-[4′-chlorophenyl-(1′)]-5-[4″-sulfomethylaminophenyl-(1″)]-1:3:4-ox-diazole of the formula

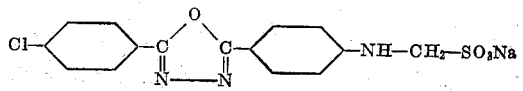

The wool is then rinsed and dried. The treated wool has a higher content of white than the untreated wool.

In the same manner wool can be treated with the reaction products from formaldehyde, benzaldehyde, acetaldehyde or furfural, sodium bisulfite or the following amines: 2-[4'-methoxyphenyl-(1')]-5-[4"-aminophenyl-(1")]-1:3:4-ox-diazole, 2-[4'-methylphenyl-(1')]-5-[4"-aminophenyl-(1")]-1:3:5-ox-diazole, 2-[2'-methoxyphenyl-(1')]-5-[4"-aminophenyl-(1")]-1:3:4-ox-diazole or 2-[phenyl-(1')]-5-[4"-aminophenyl-(1")]-1:3:4-ox-diazole.

Also the condensation product of the formula

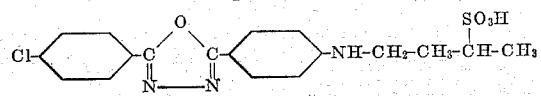

can be used in this manner.

A solution of formaldehyde-bisulfite is prepared from 104 parts of sodium bisulfite solution of 10 percent strength and 32.4 parts of aqueous formaldehyde solution of 40 percent strength, and the solution is rendered weakly alkaline with sodium carbonate. To the solution are added 12.4 parts of 2-[4'-chlorophenyl-(1')]-5-[4"-aminophenyl-(1")]-1:3:4-ox-diazole, and the whole is boiled under reflux until the greater part of the said oxdiazole compound has dissolved, which takes 24–48 hours. The mixture is filtered hot to remove unreacted starting material and impurities, the filtrate is cooled, whereupon the condensation product precipitates out, and further precipitation of the condensation product is brought about by the addition of a salting-out agent, for example, sodium chloride solution. The mixture is filtered, and the filter residue is washed with sodium chloride solution and dried.

There is obtained the sodium salt of 2-[4'-chlorophenyl-(1')]-5-[4"-sulfomethylamino-phenyl-(1")]-1:3:4-ox-diazole of the formula

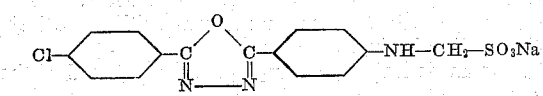

in the form of a yellowish white powder which is soluble in water. An aqueous solution of this product, when subjected to ultra-violet light exhibits a bluish fluorescence.

By using, instead of the aforesaid 2-[4'-chlorophenyl-(1')]-5-[4"-aminophenyl-(1")]-1:3:4-ox-diazole, an equivalent quantity of 2-[4'-methoxyphenyl-(1')]-5-[4"-aminophenyl-(1")]-1:3:4-ox-diazole, of 2-[4'-methylphenyl-(1')]-5-[4"-aminophenyl-(1")]-1:3:4-ox-diazole, of 2-[2'-methoxyphenyl-(1')]-5-[4"-aminophenyl-(1")]-1:3:4-ox-diazole or of 2-[phenyl-(1')]-5-[4"-aminophenyl-(1")]-1:3:4-ox-diazole, there are obtained products having similar properties.

Products having similar properties are also obtained by using in this example, instead of formaldehyde, an equivalent qauntity of benzaldehyde, acetaldehyde or furfural.

The above-mentioned 2-[4'-chlorophenyl-(1')]-5-[4"-aminophenyl-(1")]-1:3:4-ox-diazole may be prepared as follows:

51.2 parts of para-chlorobenzoic acid monohydrazide and 50.1 parts of para-nitrobenzene are slowly added to 192 parts of oleum (containing 27 percent of free $SO_3$), while cooling and stirring well, so that the temperature does not exceed 30° C. The temperature is then raised in 30 minutes to 65° C. and then the whole is stirred for 5–6 hours at 75–80° C. The reaction mixture is cooled and poured, while stirring, into 1000 parts of ice water, whereupon the condensation product precipitates out in the form of a white suspension. The precipitate is filtered off with suction, washed with cold water and then with warm water until the washings are neutral to Congo, and finally the filter residue is stirred in 1000 parts of water at 70–80° C. and rendered distinctly alkaline with sodium carbonate. By filtering the mixture with suction, washing the filter residue with water and drying it, there is obtained 2-[4'-chlorophenyl-(1')]-5-[4"-nitrophenyl-(1")]-1:3:4-ox-diazole of the formula

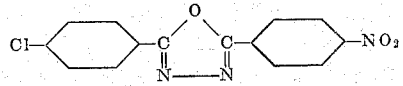

in good yield in the form of a white powder which melts at 254–259° C. after recrystallization from chlorobenzene.

42 parts of 2-[4-chlorophenyl-(1')]-5-[4"-nitrophenyl-(1")]-1:3:4-ox-diazole are reduced in 1500 parts by volume of ethanol by the addition of 50 parts of concentrated hydrochloric acid and 110 parts of iron powder and boiling the mixture for 20 hours under reflux while stirring. The reaction mixture is rendered alkaline with sodium hydroxide solution of 30 percent strength, the mixture is filtered while hot and the filtrate is diluted with its own volume of water, whereupon 2-[4'-chlorophenyl-(1')]-5-[4"-aminophenyl-(1")]-1:3:4-ox-diazole of the formula

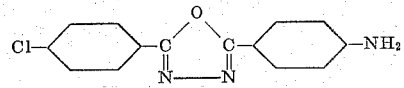

precipitates as a white substance. After filtering off the precipitate with suction, washing it with water and recrystallizing it from ethanol it melts at 201–203° C.

12.4 parts of 2-[4'-chlorophenyl-(1')]-5-[4"-aminophenyl-(1")]-1:3:4-ox-diazole and 16 parts of butane sultone are melted together at 155–160° C., during which there is a spontaneous evolution of heat. The clear brownish yellow melt gradually becomes viscous and, after being cooled, solidifies to a brittle mass. The latter is dissolved in water with the addition of sodium carbonate, the mixture is filtered to remove traces of impurities, and the clear solution is evaporated on a water bath. The sodium salt of the condensation product of the formula

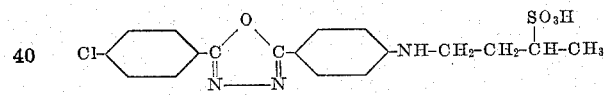

is obtained in the form of a yellow powder which dissolves in hot water with a blue fluorescence.

What is claimed is:

1. A process for optically brightening wool which comprises fixing on the wool from an aqueous bath a compound of the formula

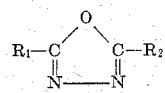

in which $R_1$ and $R_2$ represent aromatic monocyclic radicals bound directly to the ox-diazole ring, and which compound contains a single amino group and this amino group is in para-position to the ox-diazole ring.

2. A process for optically brightening wool which comprises fixing on the wool from an aqueous bath a compound of the formula

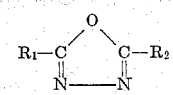

in which $R_1$ and $R_2$ represent aromatic monocyclic radicals bound directly to the ox-diazole ring, and which compound contains a single amino group and this amino group is in para-position to the ox-diazole ring and has the composition

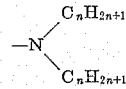

wherein $n$ denotes a whole number of at the most 2.

3. A process for optically brightening wool which comprises fixing on the wool from an aqueous bath an aldehyde bisulfite addition compound of an amine corresponding to the formula

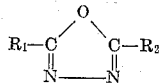

in which $R_1$ and $R_2$ represent aromatic monocyclic radicals bound directly to the ox-diazole ring and which amine contains a single amino group and this amino group is a primary amino group and is in para-position to the ox-diazole ring.

4. A process for optically brightening wool which comprises fixing on the wool from an aqueous bath a compound of the formula

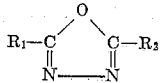

in which $R_1$ and $R_2$ represent aromatic monocyclic radicals bound directly to the ox-diazole ring, and which compound contains a single amino group and this amino group is in para-position to the ox-diazole ring and has the composition $$-NH-C_nS_{2n}-SO_3H$$

wherein $n$ denotes a whole number of at the most 4.

5. A process for optically brightening wool which comprises fixing on the wool from an aqueous bath a compound of the formula

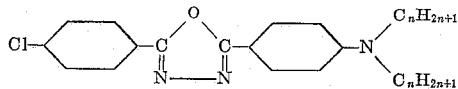

wherein $n$ represents a whole number of at the most 2.

6. A process for optically brightening wool which comprises fixing on the wool from an aqueous bath a compound of the formula

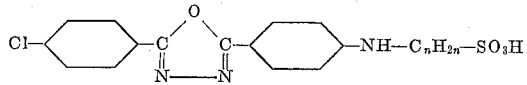

wherein $n$ represents a whole number of at the most 4.

7. A process for optically brightening wool which comprises fixing on the wool from an aqueous bath a compound of the formula

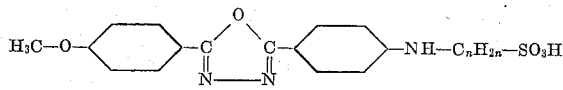

wherein $n$ represents a whole number of at the most 4.

8. A process for optically brightening wool which comprises fixing on the wool from an aqueous bath the compound of the formula

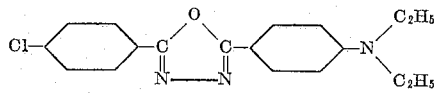

9. A process for optically brightening wool which comprises fixing on the wool from an aqueous bath the compound of the formula

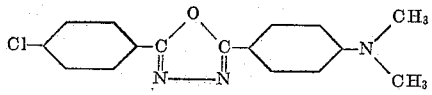

10. A process for optically brightening wool which comprises fixing on the wool from an aqueous bath the compound of the formula

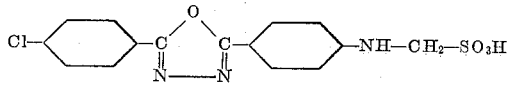

11. A process for optically brightening wool which comprises fixing on the wool from an aqueous bath the compound of the formula

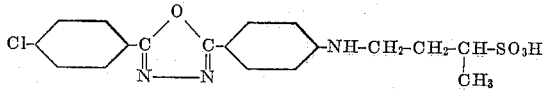

12. A process for optically brightening wool which comprises fixing on the wool from an aqueous bath the compound of the formula

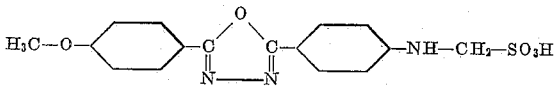

13. As an optical brightening agent a compound of the formula

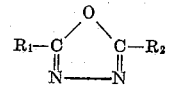

in which $R_1$ and $R_2$ represent aromatic radicals each of which contains three conjugated carbon-to-carbon double bonds in conjugated relation with the double bonds of the ox-diazole ring, and which compound contains, as sole amino group, an amino group in para-position relatively to the ox-diazole ring.

14. As an optical brightening agent a compound of the formula

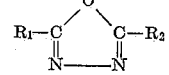

in which $R_1$ and $R_2$ represent aromatic monocyclic radicals bound directly to the ox-diazole ring, and which compound contains, as sole amino group, an amino group in para-position to the ox-diazole ring.

References Cited in the file of this patent
UNITED STATES PATENTS

| | | |
|---|---|---|
| 2,476,525 | Anish | July 19, 1949 |
| 2,661,305 | Appleton | Dec. 1, 1953 |
| 2,726,246 | Trosken | Dec. 6, 1955 |
| 2,765,239 | Siegrist | Oct. 2, 1956 |
| 2,765,304 | Siegrist et al. | Oct. 2, 1956 |

UNITED STATES PATENT OFFICE
Certificate of Correction

Patent No. 2,856,311                                                        October 14, 1958

Adolf Emil Siegrist et al.

It is hereby certified that error appears in the printed specification of the above numbered patent requiring correction and that the said Letters Patent should read as corrected below.

Column 1, line 51, after "such" insert —as—; line 54, for "ethyle" read —ethyl—; column 5, lines 13 to 15, the right-hand portion of the formula should read as shown below instead of as in the patent—

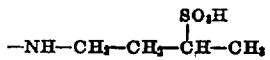

line 56, for "qauntity" read —quantity—; column 7, lines 24 to 25, central portion of the formula, for "—$C_nS_{2n}$—" read — —$C_nH_{2n}$— —.

Signed and sealed this 19th day of May, 1959.

[SEAL]

Attest:
KARL H. AXLINE,
*Attesting Officer.*

ROBERT C. WATSON,
*Commissioner of Patents.*